June 5, 1956 — T. B. CHACE — 2,749,044
AUTOMATIC THERMOSTATIC REGISTER
Filed Oct. 31, 1951 — 3 Sheets-Sheet 1
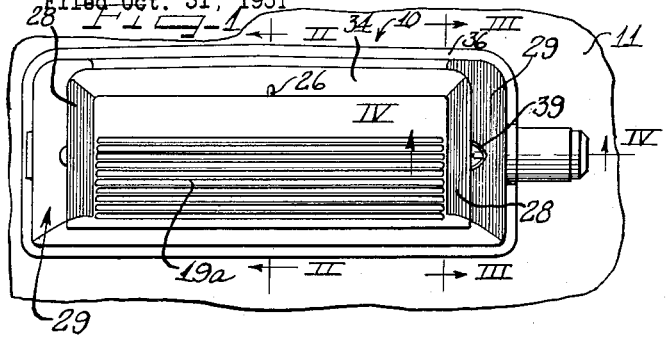
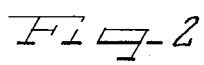
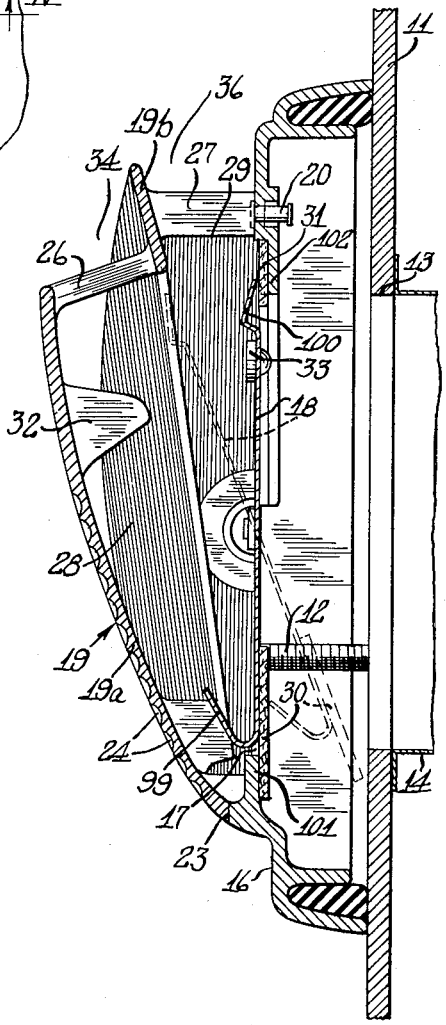
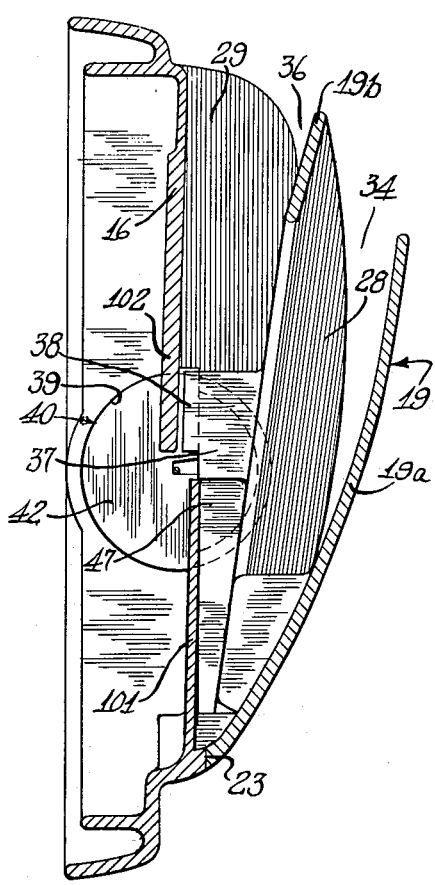
Inventor
Thomas B. Chace June 5, 1956 T. B. CHACE 2,749,044
AUTOMATIC THERMOSTATIC REGISTER
Filed Oct. 31, 1951 3 Sheets-Sheet 2
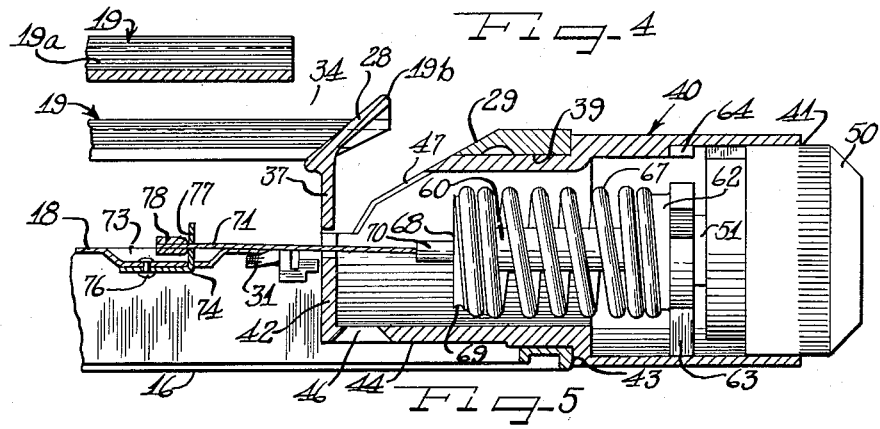
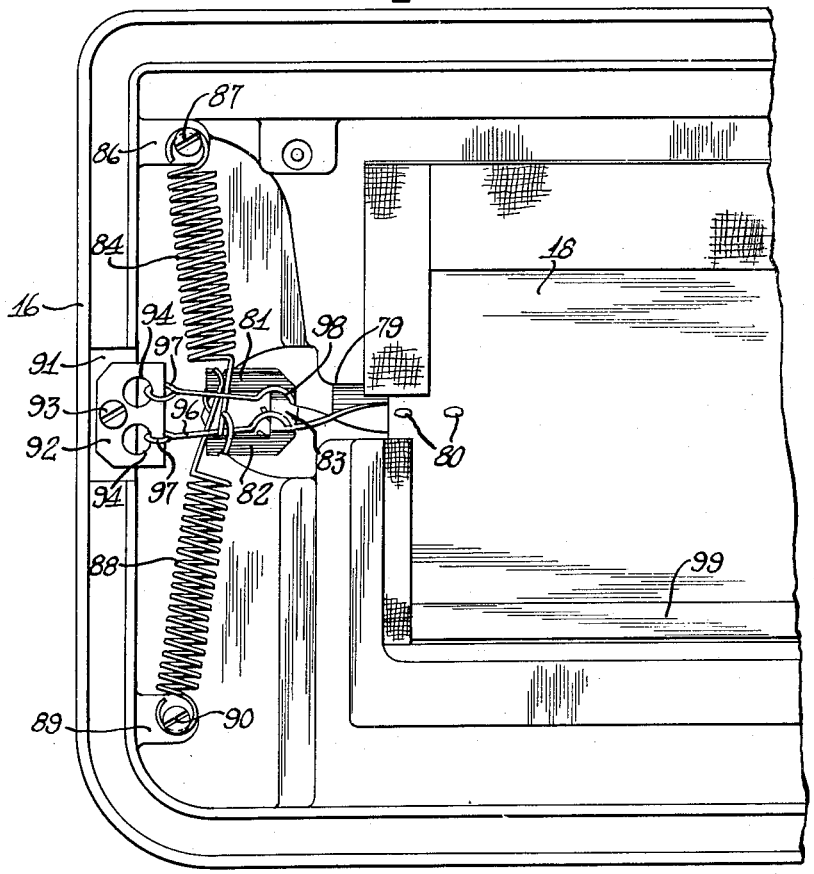
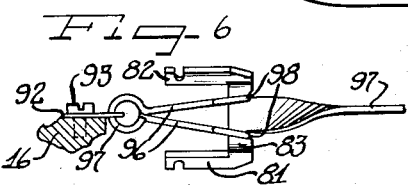
Inventor
Thomas B. Chace June 5, 1956 T. B. CHACE 2,749,044
AUTOMATIC THERMOSTATIC REGISTER
Filed Oct. 31, 1951 3 Sheets-Sheet 3
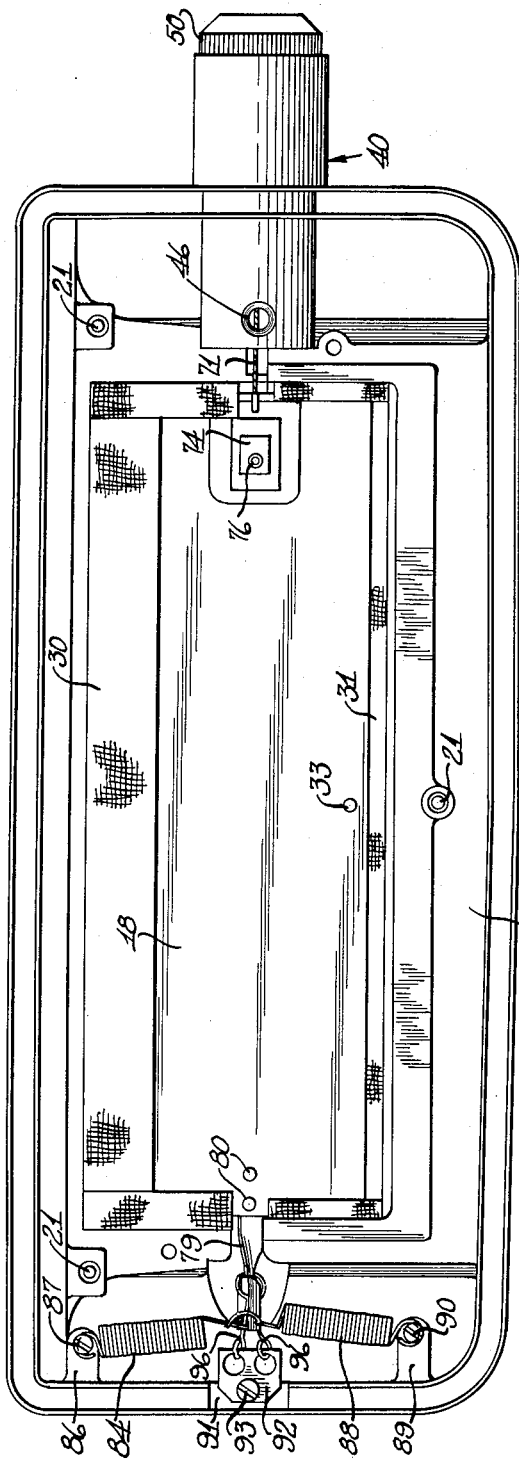
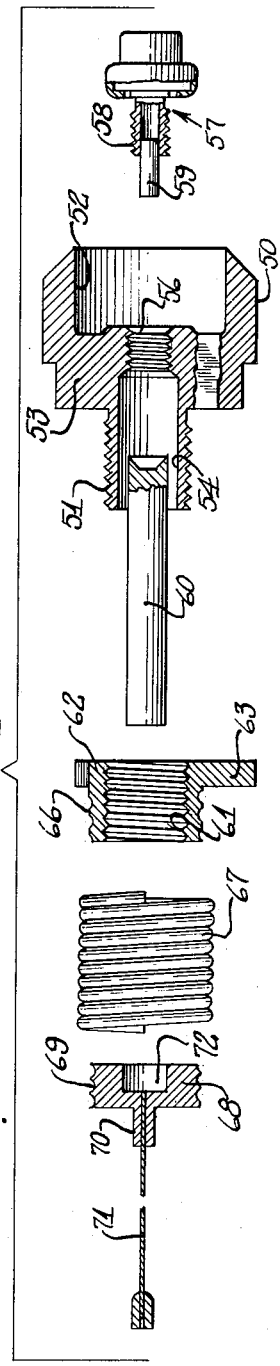
Inventor
Thomas B. Chace United States Patent Office 2,749,044
Patented June 5, 1956

2,749,044

AUTOMATIC THERMOSTATIC REGISTER

Thomas B. Chace, Chicago, Ill., assignor to The Dole Valve Company, Chicago, Ill., a corporation of Illinois Application October 31, 1951, Serial No. 254,107

6 Claims. (Cl. 236—49)

This invention relates generally to ventilating apparatus and more particularly relates to a ventilating register structure of the type having a thermostatically controlled shutter to regulate the flow of pressurized ventilating fluid from a duct outlet opening.

According to the general features of the present invention, there is provided a housing having an air flow passage therethrough controlled by a shutter suspended on one end in the housing by twisted members which torsionally load the shutter and on its other end by a tension cord to a thermostatic device of the type having linearly translatable eelments responsive to variations in temperature. An aspirating housing for the thermostatic device induces the flow of atmospheric air outside of the duct past the thermostatic device.

A plurality of louvres are mounted on the housing and include a first vane having an edge portion spaced outwardly from the housing and a second vane located between the first vane and the housing. Both of the vanes cooperate with the angularly positionable shutter in the air passage and together therewith form a plurality of air channels which direct air flow in a distribution pattern fanning out away from the housing and in an area generally adjacent the plane of the housing.

The second vane includes an upstanding wall portion which effectively isolates the thermostatic device and the aspirator outlet thereby insuring the effective operation of the thermostatic device without interference occasioned by the proximate flow of temperature conditioned ventilating air emanating from the air passage of the housing.

A particular feature of the present invention resides in the provision of suspension links between one end of the shutter and the frame, which links comprise wire members having connecting loops on opposite ends thereof angularly offset from one another and adapted to be connected to the shutter and to the housing in spaced apart alignment on relatively offset axes so as to torsionally load the shutter.

Another feature of the present invention resides in the provision of an L-clip having one leg connected to the flat vane type shutter at one end thereof in an embossed recess, the other leg of the L-clip having a slot formed therein coincident with the general plane of the flat vane and receiving a tension wire so that forces of translation may be imparted to the shutter along the turning axis of the shutter.

The present invention further contemplates the provision of an improved thermostatic control device wherein a knob having a thermal power unit threaded thereinto may be axially adjusted relative to a support member. The support member and a retainer secured to a tension wire connected to the angularly displaceable shutter are each secured in threaded assembly to opposite ends of a coil spring and the thermostatic power unit is adapted to deliver movements of translation to the retainer against the tension of the spring. Axial adjustment of the knob relative to the support member will control the effective range of the thermal power unit.

Many other features, advantages, and additional objects of the present invention will become manifest to those versed in the art upon making reference to the detailed description which follows and the accompanying sheets of drawings in which a preferred structural embodiment of a ventilating register incorporating the principles of the present invention is shown by way of illustrative example.

On the drawings:

Figure 1 is a reduced elevational fragmentary view showing a ventilating register according to the principles of the present invention mounted on a wall in registry with a duct outlet and adapted to control the flow of fluid outwardly therefrom thermostatically;

Figure 2 is a cross-sectional view taken substantially on line II—II of Figure 1;

Figure 3 is a cross-sectional view with parts removed showing additional details of construction and taken substantially on line III—III of Figure 1;

Figure 4 is a fragmentary cross-sectional view with parts shown in elevation taken substantially on line IV—IV of Figure 1;

Figure 5 is a fragmentary rear elevational view showing additional details of construction;

Figure 6 is a fragmentary elevational view with parts removed showing additional features of construction of the suspension members;

Figure 7 is a rear elevational view of the ventilating register provided in accordance with the principles of the present invention; and Figure 8 is an exploded view showing parts in cross section and showing some parts broken away and others in elevation of a thermostatic control device in accordance with the principles of the present invention.

As shown on the drawings:

In Figure 1 is shown a ventilating register 10 mounted on a wall 11 by means of a plurality of fasteners 12 in registry with a wall opening 13 formed at the end of a duct 14 adapted to carry a supply of pressurized ventilating fluid from a temperature conditioning source such as a forced air temperature conditioning unit.

The register 10 comprises a housing 16 sometimes referred to herein as a frame and is provided with a duct outlet opening 17 controlled by a damper or shutter 18.

A plurality of louvers are formed as an integral member 19 which is firmly assembled to the housing 16 by a plurality of snap acting fasteners including pins 20 provided on the member 19 and corresponding receptacles 21 formed on the housing 16.

The louver forming member comprises a first vane 19a which extends across the width of the register 10 and has a bottom edge portion abuttingly engaging the housing 16 as at 23. A plurality of parallel longitudinal recesses 24 are provided in the face of the first vane 19a to enhance the decorative appearance of the register 10. The opposite edge portion of the first vane 19a is spaced outwardly from the housing 16 so that the body portion of the vane 19a is generally disposed on a plane intersecting the plane of the housing 16 and hence, the plane of the wall 11.

The louvre forming member 19 further includes a second vane 19b which is located between the first vane 19a and the housing 16. A support spacer 26 retains the upper leg portion of the vane 19b in substantially parallel spaced relationship to the first vane 19a, the spacing relationship between the vane 19a and the vane 19b being substantially equal to the spacing relationship between the vane 19b and the housing 16. A centrally disposed support spacer 27 carries one of the pins 20 and forms a support between the second vane 19b and the housing 16. As shown in Figures 1 and 2, the vertical portion of the second vane 19b appearing on what constitutes the left hand side of Figure 1 is angularly offset so as to form a plane which, if extended, would intersect the general plane of the housing 16 and hence of the wall 11. The other vertical leg of the second vane 19b is also angularly offset as is more particularly shown in Figure 4, the offset portion of the second vane 19b being indicated at 28.

At the opposite ends of the housing 16, a pair of angularly inclined bosses are formed which are arranged in general parallel alignment to the offset portions 28 of the second vane 19b. The bosses on the housing 16 are indicated by the reference numeral 29.

The frame 16 is provided with margins which surround the duct outlet 17, the bottom margin being overlapped by a strip of felt 30 carried on the shutter 18 and the upper margin carrying a strip of felt 31 which acts as a cushion to seat the top edge of the shutter 18 when in closed position.

When the shutter 18 moves to an open position, it moves counterclockwise as viewed in Figure 2 and aligns itself substantially in coplanar relationship to the second vane 19b. This position of the shutter 18 is shown in dotted lines on Figure 2. It may be noted that a stop 32 is carried by the vane 19a to engage a resilient bumper 33 carried on the shutter 18.

When the shutter 18 is in an open position, it will be noted that the vane 19a of the louvre forming member 19 together with the shutter 18 and the second vane 19b form an air channel 34 which directs the flow of air emanating outwardly from the outlet 17 upwardly and to the sides of the register 10 in a fanned out pattern adjacent the wall 11.

The second vane 19b together with the shutter 18 and the housing 16 form a second air channel 36 which directs the flow of air upwardly and to the sides of the register 10 in a fanned out pattern adjacent the wall 11.

The offset portion 28 of the second vane 19b adjacent one end of the housing 16 is provided with a depending leg 37 most clearly shown in Figures 3 and 4, the leg 37 including a protruding foot portion 38 extending below the level of the lower section of the houisng 16. The purpose of the leg 37 and the foot 38 will become more clear from the descriptive subject matter following.

The structure thus provided directs a flow of air in a fanned out pattern adjacent the wall 11 so as to preclude a blasty type of air distribution.

At one end of the housing 16 is provided an aperture 39 which receives a generally cylindrical aspirator housing 40. The aspirator housing 40 comprises a tube which is open at one end as indicated at 41 and which is substantially closed at the other end as indicated at 42 (Figures 3 and 4). The aspirator housing 40 is provided with a medial shoulder 43 at the end of a reduced diameter portion 44 so as to facilitate insertion of the aspirator housing 40 into the aperture 39 until the shoulder 43 abuttingly engages the housing 16.

At one end of the aspirator housing 40, there is provided a pair of openings of different size which are substantially coaxially aligned in the direction of air flow from the duct 14. A relatively small opening 46 communicates directly with the duct 14 and an opening 47 of relatively larger size communicates with the atmosphere outside of the duct 14. The aspirator housing 14 is located in the aperture 39 of the housing 16 in such a manner that the opening 47 is positioned directly adjacent the leg 37 and the foot 38. Thus, the leg 37, the foot 38 and the offset portion 28 of the second vane 19b completely isolate the opening 47 from the flow of pressurized ventilating fluid. Moreover, the pressurized ventilating fluid from the duct 14 will flow into the opening 46 and into the tubular bore of the aspirator housing 14 and outwardly thereof through the enlarged opening 47 which is in line with the opening 46. The flow of ventilating fluid through the openings 46 and 47 will induce an aspirating flow of air from the atmosphere through the open end 41 of the aspirator housing 40. Thus, the interior of the aspirator housing 40 will be continuously exposed to the temperatures prevailing in the atmosphere outside of the duct 14 as represented by the air flowing through the open end 41 of the aspirator housing 40.

Situated within the aspirator housing 40 is a thermostatic control device which operates to control the angular position of the shutter 18 in the duct outlet 17. The details of the thermostatic control device are best understood by referring to Figure 4 in connection with Figure 8. An adjustment knob 50 is provided with an externally threaded hub portion 51 extending outwardly from one side thereof and is provided at the other side with a recess 52. The hub portion 51 extends into the knob 50 and is supported by a pair of diametrically opposed legs 53. The hub portion 51 is recessed as at 54 and has a partially threaded bore as at 56 to receive in threaded assembly therewith a power unit indicated generally at 57 and comprising a thermostatic device of the type having linearly translatable elements movable in response to temperature changes. The power unit 57 includes a threaded neck 58 carrying a plunger 59 to transmit the power from the power unit 57 along a linear path of translation to a spacer 60 received in the recess 54 of the knob 50.

The externally threaded hub 51 of the knob 50 threads into a complementally threaded bore 61 of a support member 62 having a plurality of radially spaced arms 63. The arms 63 slidingly engage the walls of the aspirator housing 40 and are restrained against rotation by suitable lugs 64 formed in the aspirator housing 40.

The support member 61 has a hub portion 66 which is externally threaded with spaced grooves so as to facilitate threaded assembly of one end of a coil spring 67. The other end of the coil spring 67 is threaded onto a retainer 68 having a grooved surface 69. The retainer 68 has a hollow hub 70 which receives one end of a tension cord 71 after which the hub 70 may be crimped so that the tension cord 71 and the retainer 68 will be placed in firm assembly with one another. The entire thermostatic control device is retained in the aspirator housing 40 and aspirated air flowing through the aspirator housing 40 will pass through the recess 52 of the knob 50 and pass the power unit 57 so as to be responsive to the temperature changes occurring in the atmosphere outside of the duct 14. To adjustably control the effective range of operation of the power unit 57, the knob 50 may be axially adjusted relative to the support member 62 whereupon the spacer 60 seated in a recess 72 of the retainer 68 will vary the tension of the coil spring 67.

The end of the tension wire 71 is connected to one end of the shutter 18. Adjacent one edge of the shutter 18 is provided a recess 73 formed by embossing the flat vane forming the shutter 18. A slot is formed in the bottom of the recess 73 and passes one leg of an L-clip 74 so that the L-clip may be firmly affixed to the shutter 18 by means of a rivet 76. As shown in Figure 4, one leg of the L-clip 74 engagingly abuts the recessed portion of the shutter 18 and the other leg stands uprightly and extends outwardly of the recess 73 normal to the plane of the shutter 18. The upstanding leg of the L-clip 74 is provided with a slot 77 receiving the tension wire 71. A wire end 78 is firmly attached to the free end of the tension wire 71 and secures same in assembly with the L-clip 74. It should be noted that the slot 77 formed in the upstanding leg of the L-clip 74 is aligned in generally coplanar relationship with the shutter 18 so that axis of the tension wire 71 will be coincident with the turning axis of the butterfly type vane forming the shutter 18.

At the other end of the shutter 18, a shutter bracket 79 is aligned on the turning axis of the shutter 18 by means of a plurality of fasteners 80. The shutter bracket 79 comprises a strip-like body portion having a 90° twist therein and terminating in a pair of parallel spaced fingers 81 and 82. A cross head 83 forming an integral part of the shutter bracket 79 extends between the fingers 81 and 82.

At the end of each finger 81 and 82 is located a notch receiving one end of a coiled return spring, the other end of which is firmly connected to the housing 16. A coil spring 84 is shown connected to the finger 82 and to a boss 86 having a fastener 87. A coil spring 88 is shown connected to the finger 81 and to a boss 89 having a fastener 90.

At the end of the housing 16 is provided a recess 91 which receives a link 92 secured in general coplanar alignment with the shutter 18 and in coaxial alignment with the turning axis of the shutter 18 by means of a fastener 93. The link 92 is provided with a pair of spaced apertures 94.

A pair of suspension members are located between the link 92 and the shutter bracket 79. Each of the suspension members comprises a wire having a loop portion formed on the respective ends thereof. As shown in the drawings, the suspension members are indicated at 96 and include a first loop 97 and a second loop 98. The loops 97 and 98 are angularly offset from one another, preferably by an angular distance of 90° of arc so as to be substantially at right angles to one another. The loops 97, 97 of the pair of suspension members 96, 96 are attached to the link 92 by passing the loops 97, 97 through the apertures 94, 94. The other end of the suspension members 96 is connected to the shutter by means of the shutter bracket 79. It will be noted that the loops 98, 98 are connected to the cross head 83 at spaced apart points determined by appropriate notches formed in the cross head 93.

The position of the various suspension components when the shutter 18 is in closed position is shown in Figures 6 and 7. The loops 97 are spaced apart from one another on a plane corresponding to the plane of the shutter 18 and the loops 98 are spaced apart from one another on a plane substantially offset 90° therefrom by virtue of the relative positioning of the cross head 83 on the shutter bracket 79. Thus, the twisted suspension members 96 serve to torsionally load the shutter and the shutter will assume a position of equilibrium in the duct outlet 17 corresponding to the position of equilibrium.

By varying the tension on the tension cord 71, the shutter 18 will assume a new position of equilibrium and hence the shutter 18 will be adjusted in the outlet 17. The return springs 84 and 88 serve to stabilize the operation of the structure and the variations of tension delivered by the thermostatic control device attached to the shutter insure that accurate positioning of the shutter 18 in the duct outlet 17 will be effected in response to variations of the temperature of the atmosphere outside of the duct 14.

In assembling the shutter structure and control device, the power unit 57 is maintained at a predetermined temperature and is sealed in place after the threaded neck 58 is received by the threaded bore 56 of the knob 50. In this manner, the components of the tensioning structure are properly aligned for operation in a range corresponding to the average comfort range within a space to be temperature conditioned such as the room of a residence or the like. To selectively vary the effective range of the power unit 57 in changing the tension on the shutter 18, the knob 50 may be turned to vary the relative axial adjustment between the knob 50 and the support member 62 thereby changing the tension on the coil spring 67.

To insure against vibration of the shutter against the housing 16, a spoiler 99 is formed along the bottom edge of the shutter 18 which tends to direct air in a jet fashion so as to preclude the flow of pressurized ventilating fluid across the face of the shutter 18. The top margin of the shutter 18 is also provided with an offset margin as at 100 to provide a further spoiler effect.

It will be further noted that the housing 16 is provided with a margin 101 and a margin 102 which are slightly offset insofar as planar alignment is concerned. The strip of flexible material 30 engages the margin 101 when the shutter 18 is closed and will be deflected in the general direction of the margin 101 when the shutter 18 is open. Likewise, the stripe 31 projects beyond the margin 102 and will be deflected in the direction of the offset 100 of the shutter 18 when the shutter is open. This tends to reduce rapid changes of suction acting on the shutter 18 and together with the spoiler action of the spoiler 99 and the offset 100 minimizes vibration of the shutter 18. Although various minor structural modifications might be suggested by those versed in the art, it should be understood that I wish to embody within the scope of this patent all such modifications as reasonably and properly come within the scope of my contribution to the art.

I claim as my invention:

1. In an air flow controller for controlling the flow of air from a duct, a housing having an air passage, a shutter in said passage, a tube open at one end in said housing with the closed end of said tube in said duct and the open end communicating with the atmosphere outside of said duct, said tube having a pair of different sized openings aligned on a common axis extending in the general direction of air flow from said duct, the smallest of said openings communicating directly with said duct and the largest of said openings communicating directly with the atmosphere outside of the duct, a thermostat in said tube, and a driving connection between said shutter and said thermostat extending through the end of said tube, whereby said thermostat controls said shutter in response to variations in temperature of the atmospheric air aspirated through said open end of said tube.

2. In an air flow control apparatus of the type including a duct with a thermostatically operated shutter at the end thereof for controlling the flow of air to a room, the improvement of a housing at the end of the duct, a tube having an open end projecting outwardly of said housing, and a substantially closed end in said duct, said tube having formed adjacent the closed end a pair of different sized apertures aligned on a common axis extending generally in the direction of air flow from said duct, the smallest of said apertures communicating directly with said duct and the largest of said apertures communicating with the room, said tube forming a housing for the thermal control elements to expose the thermal control elements to room air aspirated through the open end of the tube.

3. A frame having an air passage, a butterfly shutter in said passage, suspension members between one end of said shutter and said frame to torsionally load said shutter, a tension cord connected to the other end of said shutter, a retainer connected to said tension cord and having a peripheral surface of appreciable longitudinal extent providing helical thread means, tubular housing means connected to said frame, a support member having a peripheral surface of appreciable length to provide helical thread means and an internally threaded bore, a helically wound coil spring having its coils at opposite ends threaded into engagement with said helical thread means for assembly with both said retainer and said support member to tension said shutter, and a thermostatic device of the type having a translatable element, said device having an externally threaded neck portion and being threaded into said support member, said translatable element engaging and moving said retainer against the tension of said spring to vary the angular position of said shutter thermostatically.

4. A thermostatic control device comprising a knob having a hub provided with an internally threaded bore and an externally threaded portion, a thermostatic power unit of the type having a translatably movable member responsive to a change in temperature and being threaded into said internally threaded bore, a support member having an internally threaded bore to receive said externally theaded portion in adjustable assembly, and further including an external surface of appreciable longitudinal extent providing helical thread means, a helically wound coil spring having its coils at one end threaded onto said support member, a retainer having an external surface of appreciable longitudinal extent and providing helical thread means threaded into the coils of the other end of said coil spring, and a spacer engaging said movable member and said retainer to translate the movement of said movable member to said retainer, said knob and said support member being relatively axially adjustable against said coil spring to vary the effective range of said thermostat.

5. A thermostatic control device comprising a generally cylindrical support member having an internally threaded bore and providing helical thread means on its outer peripheral surface, a helically wound coil spring having its coils at one end thereof engaging said thread means and being threaded onto said support member, a retainer member having peripheral helical thread means formed thereon threaded into the coils of said spring at the other end of said coil spring, a knob having a relatively translatable element therein responsive to temperature variations, said knob having a threaded neck and being axially adjustably assembled in said threaded bore of said support member, and a spacer engaging said retainer and said translatable element, said spacer being of a sufficient length to expand said coil spring upon axially adjusting said knob, thereby to selectively control the effective range of said control device.

6. In a ventilating register structure, a frame having an air passage leading therethrough, an angularly displaceable damper member in said air passage, a strip-like body portion having a 90° twist therein extending from one end of said damper member, intermediate the sides thereof, said strip-like body terminating in a pair of parallel spaced fingers having a cross head extending therebetween, a tension spring connected at one side of said frame and extending beyond one finger and connected to the opposite finger, a second tension spring connected from the opposite side of said frame and connected to the opposite finger from the finger to which said first spring is connected, a pair of rigid suspension links connected between said frame and opposite ends of said cross head, each of said links consisting of an integral wire member having appreciable longitudinal extent and having circumferentially continuous generally arcuately shaped connecting loops formed on opposite ends thereof angularly offset from one another, one of said loops on each link being connected to said cross head adjacent one end thereof and the other of said loops on each link being connected to said housing, each respective pair of loops being connected in spaced apart alignment, opposite pairs of said loops being aligned on relatively offset axes so as to torsionally load said member, a thermostatic device of the type having a translatable element and tension means connected between the opposite end of said damper member and said translatable element to translate variable tensions to said suspension links and thereby control angular displacement of said damper member in accordance with variations in temperature.

References Cited in the file of this patent
UNITED STATES PATENTS

| | | |
|---|---|---|
| 1,704,370 | Phelan | Mar. 5, 1929 |
| 2,246,338 | Ashley | June 17, 1941 |
| 2,354,155 | Sternberg | July 18, 1944 |
| 2,388,253 | Dady | Nov. 6, 1945 |
| 2,523,497 | Copping | Sept. 26, 1950 |
| 2,523,499 | Copping | Sept. 26, 1950 |
| 2,555,978 | Kooiker | June 5, 1951 |
| 2,593,133 | Geary | Apr. 15, 1952 |
| 2,628,032 | Copping | Feb. 10, 1953 |